United States Patent [19]

Macrander

[11] 3,723,662

[45] Mar. 27, 1973

[54] D.C. COMPENSATED SUBSCRIBER INTERFACE TRANSFORMER CIRCUIT FOR TELEPHONE SYSTEM

[75] Inventor: Max S. Macrander, Warrenville, Ill.

[73] Assignee: GTE Automatic Electric Laboratories Incorporated, Northlake, Ill.

[22] Filed: Dec. 9, 1971

[21] Appl. No.: 206,273

[52] U.S. Cl. ..............................179/18 HB, 179/16 F

[51] Int. Cl. ..............................H04m 3/04

[58] Field of Search ..............................179/18 HB, 16 F

[56] References Cited

UNITED STATES PATENTS

| | | | |
|---|---|---|---|
| 3,651,271 | 3/1972 | Knauer | 179/18 HB |
| 3,536,852 | 10/1970 | Dolarmore | 179/18 HB X |
| 3,527,894 | 9/1970 | Mesenhimer et al. | 179/16 F |

*Primary Examiner*—Thomas W. Brown
*Attorney*—K. Mullerheim et al.

[57] ABSTRACT

A miniature subscriber interface transformer circuit having a d.c. compensation circuit incorporated on one or both sides is provided with means for applying a high voltage, low frequency ringing signal to the subscriber line.

10 Claims, 2 Drawing Figures

PATENTED MAR 27 1973

3,723,662

INVENTOR
MAX S. MACRANDER
BY Robert F. Van Epps
ATTORNEY

D.C. COMPENSATED SUBSCRIBER INTERFACE TRANSFORMER CIRCUIT FOR TELEPHONE SYSTEM

BACKGROUND OF THE INVENTION

1. Field of the Invention

The present invention relates generally to the field of telephony and more particularly to a d.c. compensated miniature transformer separating a subscriber loop from a switching network and having a provision for injecting high voltage, low frequency ringing signals in the subscriber loop.

2. Description of the Prior Art

There is disclosed in co-pending application Ser. No. 199,464 entitled "D.C. Compensation Circuit for Miniature Transformers" of the same inventor and assigned to the same assignee as the present application, a d.c. compensated transformer which is of particular utility as a subscriber loop interface for semiconductor switching networks. In the application of that invention in the field of telephony it is further necessary that ringing signals be injected into the subscriber loop. When conventional telephones are to be interfaced with solid state switching networks two basic problems arise in injecting ringing signals via the crosspoint switches. First, the 90 volt amplitude of the conventional ringing signal requires the use of high voltage crosspoints which have heretofore been found impractical. Second, the low frequency (i.e., typically from 16 to 60 ⅔ Hz) raises a requirement of bulky high inductance transformers or high capacitance capacitors to prevent undue losses. Even if the first problem is overcome through the availability of practical high voltage crosspoints, the second will continue to negate much of the space and cost savings potential of solid state crosspoints.

OBJECTS AND SUMMARY OF THE INVENTION

From the foregoing discussion it will be understood that among the various objectives of the present invention are:

to provide a d.c. compensated transformer with means for reinjecting a ringing signal on the subscriber loop side thereof; and to provide apparatus of the above-described character which is operable with standard telephone system voltage supplies.

These and other objectives of the present invention are efficiently achieved by injecting a ringing signal of reduced amplitude into the switching network. This signal is picked up at the network side of the called subscriber interface and reinjected at the line side at an amplitude compatible with the subscriber telephone. The reduced amplitude signal may be directed to the called subscriber interface via the existing switching network or introduced through a separate solid state switching network or logic decoder.

The preceding as well as other objects, features and advantages of the present invention will become more apparent from the following detailed description taken in conjunction with the appended drawings.

DESCRIPTION OF PREFERRED EMBODIMENT

Figure 1:
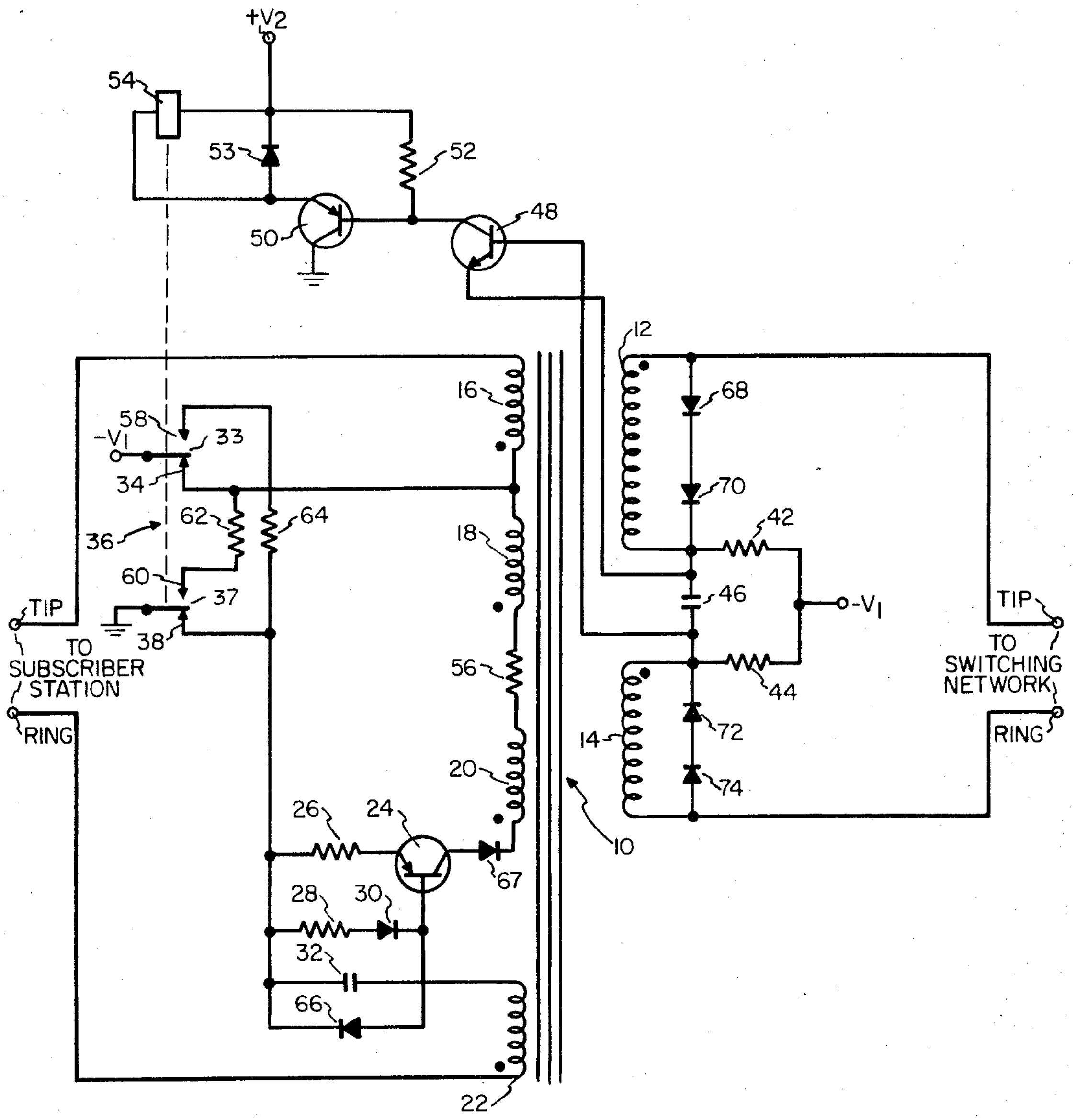
FIG. 1 is a schematic illustration of a d.c. compensated subscriber interface transformer provided with means for reinjecting a ringing signal at the subscriber line side thereof.

Turning now to FIG. 1 there is schematically illustrated a transformer 10 including windings 12 and 14 in the switching network loop and windings 16, 18, 20 and 22 in the subscriber loop. The transformer winding sense is indicated by the conventional dot notation. In accordance with the teachings of the above-referenced co-pending application a d.c. compensation circuit comprising a pnp transistor 24, resistors 26 and 28, diode 30 and capacitor 32 is coupled between subscriber loop windings 20 and 22. In the absence of a ringing signal the telephone office supply voltage, −V, (typically − 48V) is applied to the subscriber loop between windings 16 and 18 via the armature spring 33 and contact 34 of relay 36 and the d.c. compensation circuit is coupled to ground potential via armature spring 37 and contact 38 of relay 36. The office supply voltage, −V, is also applied to the switching network loop between windings 12 and 14 through substantially matched input resistors 42 and 44. In this configuration the transformer operates basically as described in the referenced co-pending application. Also as described therein a resistor 56 may be coupled between the subscriber loop windings 18 and 20 to prevent excessive dissipation of transistor 24. When, however, a ringing signal is to be applied from the switching network it appears via the transformer windings 12 and 14 at the terminals of capacitor 46. This capacitor is coupled between the windings and is sufficiently large to present a short circuit for frequencies above the ringing band. The ringing signals are coupled from their respective sides of capacitor 46 across the emitter and base of transistor 48. The collector of transistor 48 is connected in parallel with the base of transistor 50 and via resistor 52 and winding 54 of relay 36 to the emitter of transistor 50. Diode 53 is connected in conventional fashion in parallel with relay winding 54. A relay operating voltage, $+V_2$, (preferably about 5 volts) is applied to one side of relay winding 54 and the collector of transistor 50 is coupled to ground potential. The ringing signal is thus used to actuate relay 36. The negative supply voltage, $-V_1$, is thus coupled to the d.c. compensation circuit via armature spring 33 and contact 58 of relay 36 and the subscriber loop between windings 16 and 18 is coupled to ground potential through armature spring 37 and contact 60 of relay 36. Assuming that the ringing signal is at the resonant frequency of the ringer (not shown) in the subscriber station, the relay 36 will be operated at that frequency and a square wave ringing signal of amplitude, $V_1$, of the supply voltage will be applied to the subscriber line. This results in voltage excursions several times the supply voltage when measured directly across the ringer coil and produces adequate ringing for PAX and PABX type applications. In central office type applications which may involve long line loops it is the conventional practice to apply a 95V rms ringing signal to the subscriber line. Although it was found by the applicant in practical experiments with this ringing scheme that even with a relatively long subscriber loop the required supply voltage does not exceed 40 volts. As an alternative it is possible to apply an extra positive voltage source to the line during ringing. For PAX and PABX applications the normal −48V office battery can be used and no other source of ringing voltage is required for the generation of an appropriate ringing signal level at the subscriber loop side of transformer 10.

A first resistor 62 is coupled between contacts 36 and 60 and a second resistor 64 is coupled between contacts 34 and 38 such that in the event that one set of contacts in relay 36 operates slightly faster than the other a dead short between the office supply voltage, −V, and ground potential is prevented. A diode 66 is also added to the d.c. compensation circuit to provide a path for the application of $-V_1$ to the subscriber line via winding 22, while diode 67 serves to block positive current flow via contact 60. Series diodes 68 and 70 are connected in parallel with the switching network transformer loop winding 12 and series diodes 72 and 74 are similarly connected in parallel with winding 14 to provide means for clamping the amplitude of signals to be passed through the switching network.

Figure 2:
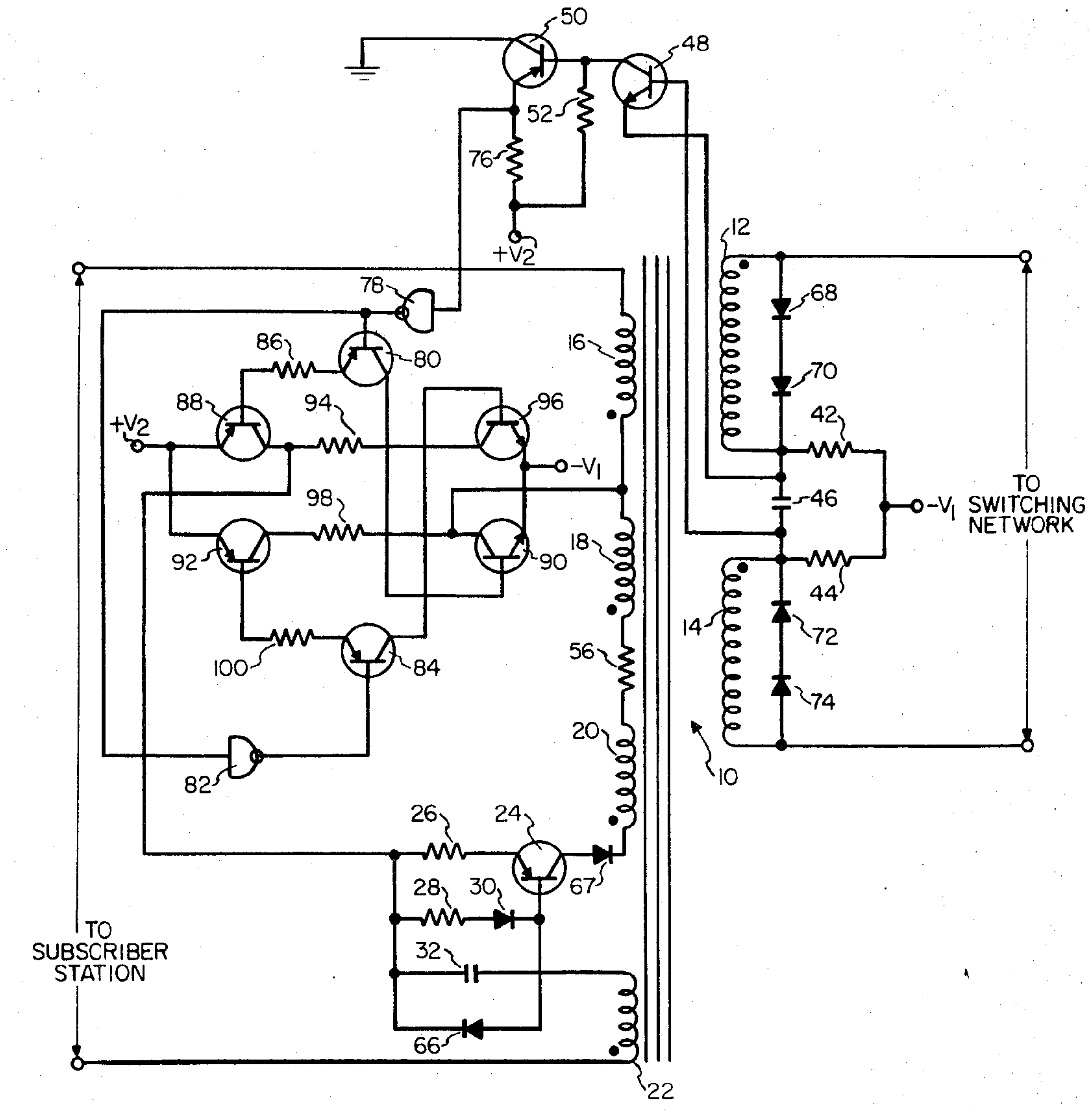
FIG. 2 is a schematic illustration of an alternative embodiment of the apparatus of FIG. 1 using solid state switching components.

With reference to FIG. 2 there is illustrated an alternative embodiment of the present invention wherein elements common to those shown in FIG. 1 are identified by like reference numerals. The arrangement shown in FIG. 2 is basically similar to that shown in FIG. 1 except that the electromechanical relays are replaced with solid state switching components. As described above the low level ringing signal is coupled from across capacitor 46 on the switching network loop side of transformer 10 to transistors 48 and 50. The switching voltage, $+V_2$, is applied via resistor 76 of the switching circuitry. The output of inverter 78 is connected in parallel to the base of transistor 80 and the input of inverter 82 which in turn has its output connected to transistor 84. Thus when transistor 80 is in a conducting state transistor 84 is not and vice versa. The emitter of transistor 80 is connected via resistor 86 to the base of transistor 88. The collector of transistor 80 is connected to the base of transistor 90. The emitter of transistor 92 is connected in parallel with the emitter of transistor 90 and the switching voltage, $+V_2$. The collector of transistor 88 is connected in parallel with the d.c. compensation circuit and via resistor 94 to the collector of transistor 96. Transistor 92 has its collector coupled in parallel via resistor 98 to the collector of transistor 90 and to the subscriber loop between windings 16 and 18. The emitter of transistor 84 is coupled through resistor 100 to the base of transistor 92 and the collector is connected to the base of transistor 96. The office battery supply voltage, $-V_1$, is applied to the emitters of transistors 90 and 96.

It will thus be seen that in the absence of a ringing signal transistors 80, 88 and 90 are in conducting states and the supply voltage, $-V_1$, is coupled through transistor 90 to the subscriber loop via winding 16 of transformer 10 and the switching voltage, $+V_2$ is applied to the d.c. compensation circuit through transistor 88. A ringing signal operates to turn transistors 84, 92 and 96 on thus establishing a path for the supply voltage, $V_1$, through transistor 96 and resistor 94 to the d.c. compensation circuit and for the switching voltage, $+V_2$, through transistor 92 and resistor 98 to the subscriber loop. The circuit will thus switch between its two conducting states at the ringing frequency. As with the electromechanical switching arrangement resistors 94 and 98 are used to prevent a short between $-V_1$ and $+V_2$ should transistors 80 and 84 inadvertently be simultaneously in the conducting state. As an alternative to the arrangement shown it will be understood that the collector of transistor 50 could be connected to a negative switching voltage, $-V_2$, and ground potential substituted for the positive switching voltage $+V_2$. In either case the principles of operation remain the same.

As with the embodiment of FIG. 1 the apparatus of FIG. 2, when actuated at the resonant frequency of the ringer in the subscriber station, exhibits the large voltage excursions which permit the use of the normal −48 volt battery supply to drive the ringer.

From the preceding description it will be seen that the Applicant has provided a new and novel subscriber interface circuit for use with semiconductor switching systems whereby the objectives set forth hereinabove are efficiently met. Since certain changes in the above-described construction will occur to those skilled in the art without departure from the scope of the invention, it is intended that all matter contained in the description or shown in the appended drawings shall be interpreted as illustrative and not in a limiting sense.

Having described what is new and novel and desired to secure by Letters Patent, what is claimed is:

1. An improved d.c. compensated electric transformer circuit for separating a subscriber loop from a switching loop in a telephone system, said transformer circuit including means for separating the transformer windings of the side of said transformer circuit connected to said subscriber loop into first and second electrical loops, means for introducing a negative polarity d.c. voltage into said separated windings at the juncture of said first and second loops to thereby produce a first direct current in a first direction in said first loop, a d.c. compensation circuit including a source of d.c. potential which is relatively more positive than said negative polarity d.c. voltage, and connected between said first and second loops for producing a second direct current in said second loop in a direction opposed to said first direction, the ampere-turn product of said first direct current in said first loop being substantially equal to the ampere-turn product of said second direct current in said second loop such that d.c. magnetic fields in said transformer circuit are substantially cancelled, means for introducing a first a.c. signal into said first loop, means through which said first a.c. signal bypasses said d.c. compensation circuit without substantial attenuation, and wherein said improvement comprises means for selectively introducing an a.c. ringing signal into the side of said transformer circuit connected to said switching loop;

means connected to said switching loop side of said transformer circuit for detecting said ringing signal and operative to produce a control signal of a frequency proportional thereto; and means coupled to said ringing signal detecting means for connecting said juncture to said negative polarity d.c. voltage and said d.c. compensation circuit to said relatively more positive potential in the absence of said control signal, and responsive to said control signal to switch the juncture of said first and second loops and said d.c. compensation circuit alternately from said negative polarity d.c. voltage to said relatively more positive potential at said control signal frequency.

2. Apparatus as recited in claim 1 wherein said ringing signal detecting means comprises means for separating the windings of said switching loop side of said transformer circuit into first and second windings, a capacitance connected between said first and second windings, and a driver circuit connected across said capacitance.

3. Apparatus as recited in claim 2 wherein said switching means comprises a relay having the winding thereof connected to said driver circuit, a first armature spring connected to said negative polarity d.c. voltage introducing means, a second armature spring connected to ground potential, a first make contact and a first break contact connected to said juncture of said first and second loops, and a second make contact and a second break contact connected to said d.c. compensation circuit whereby said relay is selectively operated at said ringing signal frequency.

4. Apparatus as recited in claim 3 wherein said driver circuit comprises an npn transistor having the emitter and base thereof connected across said capacitance, a pnp transistor having the base thereof connected to the collector of said npn transistor, the collector thereof connected to ground potential, and the emitter thereof connected to one side of said relay winding, and a source of relay control voltage connected to the base of said pnp transistor and to the other side of said relay winding.

5. Apparatus as recited in claim 3 further including a first resistance connected between said first make contact and said first break contact of said relay, and a second resistance connected between said second make contact and said second break contact of said relay.

6. Apparatus as recited in claim 1 further including a diode having the anode thereof coupled to said first electrical loop and the cathode thereof connected to said switching means.

7. Apparatus as recited in claim 2 wherein said switching means comprises a solid state switching network connected to said driver circuit, to said negative polarity d.c. voltage introducing means, to said source of relatively more positive potential, to said juncture of said first and second loops, and to said d.c. compensation circuit, said network having two conducting states controlled by said driver circuit, a first state for applying said negative polarity d.c. voltage to said juncture of said first and second loops and for applying said source of relatively more positive potential to said d.c. compensation circuit, and a second state providing the reverse of said first state whereby in response to said control signal the juncture of said first and second loops and said d.c. compensation circuit are switched from said negative polarity d.c. voltage to said relatively more positive potential at said control signal frequency, and in the absence of said control signal said juncture is connected to said negative polarity d.c. voltage and said d.c. compensation circuit is connected to said relatively more positive potential.

8. Apparatus as recited in claim 7 wherein said relatively more positive potential is a positive polarity potential, and said driver circuit comprises an npn transistor having the emitter and base thereof connected across said capacitance, a pnp transistor having the base thereof connected to the collector of said npn transistor, the collector connected to ground potential, and the emitter connected in parallel to said source of positive polarity potential and to said switching network.

9. Apparatus as recited in claim 7 wherein said relatively more positive potential is ground potential, and said driver circuit comprises an npn transistor having the emitter and base thereof connected across said capacitance, a pnp transistor having the base thereof connected to the collector of said npn transistor, and the emitter thereof connected in parallel to ground potential and to said switching network, and a source of negative polarity control potential less than said negative polarity d.c. voltage connected to the collector of said pnp transistor.

10. Apparatus as recited in claim 2 further including first and second series diodes connected across each of said first and second switching loop side windings of said transformer circuit for providing clamping of signals passed thereby.

* * * * *